(12) United States Patent
Hubbard et al.

(10) Patent No.: US 6,235,105 B1
(45) Date of Patent: May 22, 2001

(54) THIN FILM PIGMENTED OPTICAL COATING COMPOSITIONS

(75) Inventors: Ronald N. Hubbard, Encinitas; Terry D. Gulden, La Jolla; Michael T. Martin, Lakeside, all of CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/234,807

(22) Filed: Jan. 19, 1999

Related U.S. Application Data

(63) Continuation-in-part of application No. 09/130,048, filed on Aug. 6, 1998, now abandoned, which is a continuation-in-part of application No. 08/629,111, filed on Apr. 8, 1996, now abandoned, which is a continuation-in-part of application No. 08/349,979, filed on Dec. 6, 1994, now Pat. No. 5,506,053.

(51) Int. Cl.$^7$ ............................. C09C 1/00; C09C 1/04; C09C 1/24; C09C 1/28; C09C 1/36

(52) U.S. Cl. ................. 106/415; 106/403; 106/419; 106/432; 106/436; 106/445; 106/447; 106/450; 106/452; 106/453; 106/456; 106/460; 106/465; 106/471; 106/480; 106/499; 428/325; 428/343

(58) Field of Search ................... 106/403, 415, 106/419, 432, 436, 445, 447, 450, 452, 453, 456, 460, 465, 471, 480, 499; 428/325

(56) References Cited

U.S. PATENT DOCUMENTS

| | | | |
|---|---|---|---|
| 2,676,117 | 4/1954 | Colbert et al. ................ 117/71 |
| 3,033,701 | 5/1962 | Wozniak ....................... 359/359 |
| 3,034,924 | 5/1962 | Kraus et al. .................. 117/106 |
| 3,410,625 | 11/1968 | Edwards ...................... 359/359 |
| 3,697,153 | 10/1972 | Zycha .......................... 359/359 |
| 3,853,386 | 12/1974 | Ritter et al. ................. 359/359 |
| 3,944,440 | 3/1976 | Franz .......................... 148/6.3 |
| 3,984,581 | 10/1976 | Dobler et al. ................ 427/35 |
| 4,057,316 | 11/1977 | Hacman et al. ............. 359/359 |
| 4,102,768 | 7/1978 | Kearin et al. ............ 204/192 P |
| 4,145,113 | 3/1979 | Ranninger et al. .......... 359/588 |
| 4,168,986 | 9/1979 | Venis, Jr. .................... 106/291 |
| 4,204,942 | 5/1980 | Chahroudi ................... 204/298 |
| 4,240,696 | 12/1980 | Tracy et al. ................. 359/359 |
| 4,298,444 | 11/1981 | Chahroudi ................... 204/192 |
| 4,337,990 | 7/1982 | Fan et al. .................... 350/1.7 |
| 4,407,685 | 10/1983 | Hankland ..................... 156/212 |
| 4,414,254 | 11/1983 | Iwata et al. ................. 428/34 |
| 4,430,010 | 2/1984 | Ash .............................. 106/291 |
| 4,461,532 | 7/1984 | Sato et al. ................... 359/359 |
| 4,497,700 | 2/1985 | Groth et al. .............. 204/192 P |
| 4,498,728 | 2/1985 | Thoni et al. ................. 359/359 |
| 4,593,009 | 6/1986 | Novinski ..................... 501/105 |
| 4,602,847 | 7/1986 | Born et al. .................. 359/359 |
| 4,711,814 | 12/1987 | Teichmann .................. 428/403 |
| 4,770,496 | 9/1988 | Mahlein ...................... 359/589 |
| 4,803,110 | 2/1989 | Ahn et al. ................... 428/137 |
| 4,838,648 | 6/1989 | Phillips et al. ............. 350/166 |
| 4,842,893 | 6/1989 | Yializis et al. ............. 427/44 |
| 4,851,095 | 7/1989 | Scoby et al. ............. 204/192.12 |
| 4,854,670 | 8/1989 | Mellor ......................... 359/589 |
| 4,857,161 | 8/1989 | Borel et al. .............. 204/192.26 |
| 4,921,882 | 5/1990 | Senich ......................... 522/99 |
| 4,923,585 | 5/1990 | Krauss et al. ............ 204/298.04 |
| 4,983,001 | 1/1991 | Hagiuda et al. ............ 359/359 |
| 4,988,424 | 1/1991 | Woodward et al. ..... 204/192.29 |
| 4,997,241 | 3/1991 | Muratomi .................... 359/589 |
| 5,059,245 | 10/1991 | Phillips et al. ............. 106/22 |
| 5,188,887 | 2/1993 | Linge et al. ............. 359/359 X |
| 5,204,163 | 4/1993 | Nakatsuka et al. ......... 428/195 |
| 5,233,465 | 8/1993 | Wheatley et al. .......... 359/359 |
| 5,243,458 | 9/1993 | Hatano et al. .............. 359/359 |
| 5,341,238 | 8/1994 | Trost et al. ................. 359/359 |
| 5,366,664 | 11/1994 | Varadan et al. ............ 428/402 |
| 5,506,053 | 4/1996 | Hubbard ...................... 428/402 |
| 5,569,535 | 10/1996 | Phillips et al. ............. 428/403 |
| 5,571,624 | 11/1996 | Phillips et al. ............. 428/403 |
| 5,624,486 | 4/1997 | Schmid et al. .............. 106/404 |
| 6,132,504 | * 10/2000 | Kuntz et al. ................ 106/404 |
| 6,139,613 | * 10/2000 | Hendrickson et al. ..... 106/415 |
| 6,156,115 | * 12/2000 | Pfaff et al. .................. 106/403 |

\* cited by examiner

Primary Examiner—Mark L. Bell
Assistant Examiner—Michael J. DiVerdi
(74) Attorney, Agent, or Firm—Thomas R. Juettner; Greer, Burns & Crain, Ltd.

(57) ABSTRACT

Optical coating compositions containing thin film particulates or pigments that are capable of imparting to the coating preselected optical characteristics or properties, such as selective reflectance, transmission and absorptance of light energy, are comprised of film forming binder and improved high volume pigment particles dispersed in the binder. Each pigment particle is a high volume flake comprised of an inorganic or polymer core having two sides and a thin film optical structure deposited onto each of the two sides of the core. The core occupies a large volume of the coating composition and dramatically reduces the number of flakes and the amount of thin film structures required to produce a coating of given thickness and desired optical properties. The core may also be fabricated to have diffuse and irregular side surfaces in order to render the applied coating visually diffuse and nonspecular. Methods of making the pigment particles are disclosed.

38 Claims, 3 Drawing Sheets

THIN FILM PIGMENTED OPTICAL COATING COMPOSITIONS

CROSS REFERENCE

This application is a continuation-in-part of application Ser. No. 09/130,048, filed Aug. 6, 1998, now abandoned, which is a continuation-in-part of application Ser. No. 08/629,111, filed Apr. 8, 1996 ABN, which in turn is a continuation-in-part of the application of Ronald N. Hubbard, Ser. No. 08/349,979, filed Dec. 6, 1994, which issued as U.S. Pat. No. 5,506,053 on Apr. 9, 1996.

FIELD OF THE INVENTION

The present invention relates to optical coating compositions containing thin film particles or pigments that are capable of imparting to the coating preselected optical characteristics or properties, such as selective reflectance, transmittance and absorptance of light energy over various wavelengths. The invention particularly relates to optical thin film pigment particles and methods of producing the same.

BACKGROUND

Optical interference technology has provided multilayer thin film structures and coatings for controlling reflectance, transmittance and absorptance of light energy, for example, thin film multilayer coatings that are infrared (IR) reflective and radio frequency (RF) transparent, signature control films that are reflective only in particular bands of the infrared and are otherwise transmissive or absorptive, coatings for modifying the spectral emittance of a surface by changing its reflectance and absorptance, and dichromatic color-shift coating compositions, to name but a few.

For convenience and ease of application of these thin film optical structures to surfaces and objects intended to be coated thereby, it is desirable to provide the same in the form of brushable or sprayable liquid coating compositions for application in much the same manner as paint. For such purposes, the thin film structures, if in flat or flake form, must be two-sided and produced in or reduced to a performance size in order to be suitable for use as pigments in a liquid film forming binder.

By way of example, U.S. Pat. No. 4,434,010 to Ash, and U.S. Pat. Nos. 5,059,245, 5,569,535 and 5,571,624 to Phillips et al., disclose various thin film multilayer optical structures suitable for use in a variety of optical coating compositions, namely, (1) an optical coating comprised of alternating layers of dielectric materials having different indices of refraction which, when transformed into optical paint chips or flakes, can be utilized to produce hot mirrors, cold mirrors, other selective reflectors, and optically variable color shift paints; (2) an optical coating structure comprised of cermet layers deposited on opposite sides of a central layer of reflective material and comprising pigments for use in paints having properties of selective solar absorption; and (3) an optical coating comprised in sequence of a semiopaque metal layer, a dielectric layer, a metal reflecting layer, another layer of dielectric material and a final semiopaque metal layer which produces strongly dichroic optical effects and finds particular usefulness in optically variable automotive body paints. U.S. Pat. No. 5,569,535 refers to the paint particles as high chroma color-shifting interference thin film platelets. U.S. Pat. No. 5,571,624 illustrates the manner in which the platelets are used in automotive body paints.

Since the platelets or flakes may be oriented either right side up or upside down in the final paint film, the flakes must be of symmetrical construction and exhibit the same optical properties on each of their two sides, as is illustrated in said patents.

U.S. Pat. No. 4,838,648, also to Phillips et al., discloses a variant wherein the optically variable platelets include a reflective metal layer that is magnetic, so that the paint can be magnetically encoded as well as providing color shift.

Heretofore, the flakes of multilayer thin film materials have been produced by precoating a carrier substrate with a soluble release coating and depositing thin films of the optical materials in preselected sequence onto the carrier to build up the desired multilayer thin film structure. Alternatively, the substrate itself may be soluble. After deposition of the multilayer structure, the release coat (or the substrate) is dissolved, thereby freeing the multilayer structure from the substrate so that the same can be broken up into small flakes. To insure that the flakes are of the requisite size for use as pigment particles, the same are sized by means of two screens or sieves, the first to screen out oversize particles and the second to screen out undersize particles. Oversize particles are further processed to pass through the first screen or sieve in order to serve as useful pigment particles. Undersize particles that pass through the second screen must be discarded as waste because they do not perform well and reduce the overall performance of the final coating composition. The process is tedious, time consuming and wasteful.

In an effort to make the process less wasteful and more efficient, it has been proposed to use a foraminous screen or a waffle pattern on the carrier substrate so that the multilayer film structure will be formed into pre-sized flakes, and thus divided into pre-sized flakes when it is released from the substrate. However, two sieve screening is still required.

Moreover, the pigment flakes thus produced are very thin, on the order of 0.1 to 1.0 microns. Consequently, many layers of flakes will be needed to produce a coating of given film thickness having the desired optical characteristics. For example, dichromatic coatings having a pigment particle or flake thickness of about 0.8 microns dispersed in a liquid binder or carrier at a particle volume concentration (PVC) of 15% and applied at a coating or paint film thickness of 0.004 inch (101.6 microns) will require 15.24 microns of thin film structure, which in turn dictates use of 19 of the flakes throughout the paint film thickness, even though it is only the top flake in the coating that provides the dichromatic effect, i.e., the visual color shift when the paint is viewed from different angles. As another example, for infrared reflectance, the concentration or loading of flakes in a film forming binder must be in the order of 10 to 40% by volume in order to achieve high reflectance. For a typical coating thickness of 50 microns, typical flake thickness of 0.2 microns, and a volume loading of 20%, fifty flakes are required through the thickness of the coating, despite the fact it is only the top flake that provides the optical benefit. This constitutes an extremely inefficient use of very expensive multilayer flakes.

U.S. Pat. No. 5,506,053 to Ronald N. Hubbard, discloses an infrared (IR) reflective, radio frequency (RF) transparent coating composition wherein the pigment particles comprise thin film coated dielectric microspheres ranging in size from about 5 to about 500 microns. The microspheres thus fill up a large volume in a coating composition so that only a few layers, e.g., one or two layers of the coated spheres are required in a coating of conventional thickness.

SUMMARY OF THE INVENTION

The object of the present invention is to provide flake-type pigment particles of high volume that are very economical to produce and very efficient and convenient to use.

In accordance with the invention, flake-like thin film optical pigment particles are comprised of an inorganic or polymer substrate that is coated on both sides with thin film optical coatings and then cut or divided into particles of selected geometric shape and size.

The flakes are made by coating both sides of a sheet or film of preselected thickness with the desired thin film structures and cutting or otherwise dividing the dual coated sheet or film into small particles of selected size and shape, e.g., small squares of a size within the range of 10 to 500 microns, as desired to produce the optimum optical properties.

In instances wherein the substrate of the flakes is desired to be so thin that it lacks the mechanical strength to be coated without support, the flakes may be produced by using a release coated manufacturing substrate of the requisite strength, depositing a first thin film optical structure onto the release coated surface of the manufactuing substrate, roll coating or otherwise applying a thin coat or layer of an inorganic or polymer substrate material onto the first thin film optical structure, depositing a second thin film optical structure onto the layer of substrate material, dissolving the release coat to free the dual coated layer of substrate material from the manufacturing substrate, and cutting or otherwise dividing the dual coated substrate into flakes.

These manufacturing processes produce flakes of very uniform size and provide a yield of nearly 100% without the waste resulting from prior art practices.

The inexpensive inorganic or polymer substrate of the flakes fills up a large part of the volume of the coating that was previously filled with expensive multilayer thin film structures, thereby providing for highly efficient use of the thin film structures and greatly reducing the cost of the coating composition.

In comparison to the prior art dichromatic coating composition above described, the present invention may, for example, provide flakes comprised of a one micron thick polymer substrate coated on both sides with 0.8 microns thick multilayer structures. When used at a 15% PVC and a paint film thickness of 0.004 inch, only six flakes will be required in contrast to the prior art 19 flakes. Also, the amount of multilayer thin film material required will be reduced from 15.2 microns to 9.6 microns. By using a three micron thick substrate, the requisite number of flakes will be reduced to four and the requisite amount of optical coating material will be reduced to 6.4 microns, a reduction of 58% in the required quantity of expensive, vacuum deposited, multilayer thin film optical structures.

Also, in comparison to the prior example of an infrared reflective coating, a coating composition of the invention comprised of flakes made from a 3 micron thick double coated polymer substrate at a 20% by volume loading and applied at a coating thickness of 50 microns will require only three flakes instead of fifty, and will reduce the required amount of the multilayer thin film structure from 10 microns to 1.2 microns, a reduction of 88%.

Further, due to the integrity of the substrate and the coatings thereon, the pigment particles of the invention are not frangible and will not break down when the coating composition is mixed, even if violently agitated. Consequently, the pigment particles retain the performance size into which they were divided, thereby to retain optimum performance characteristics and optical properties in the applied coating.

In some applications, for example the IR reflective, RF transparent coatings disclosed in U.S. Pat. No. 5,506,053, it may be desired that the applied coating be diffuse and non-specular. Prior art IR reflective multilayer thin film flakes are highly specular and metallic in appearance. This causes extreme difficulties in formulating paints and coatings with low visual reflectance and visual coloration. Attempts to add visual color pigments and extenders for color matching and lower gloss result in serious degradation of the infrared performance of the applied coating.

In practice of the present invention, use of a smooth surfaced substrate will similarly result in a flake that is specular and highly reflective in the visual spectrum, which is desirable for many applications, but not for all applications.

It is therefore another object of the present invention to render the pigment flakes of the invention visually diffuse, nonspecular, and of very low gloss. This is achieved by the provision of a sheet or film of substrate material having rough, irregular or incoherent surfaces that are visually diffuse.

In accordance with this aspect of the invention, the substrate is comprised of particular matter dispersed in a polymer or inorganic matrix such that the surfaces of the resultant sheet or film replicate the contained particulate matter. The particulate matter may be of any desired shape and will generally be of a size within the range of from about 1 to 15 microns. Especially useful for the purpose are lightweight dielectric microspheres or microballoons. These spherical inclusions in the polymer backbone of the flake provide top and bottom surfaces that replicate the spheres in a monolayer configuration. The surfaces are therefore visually diffuse and produce IR reflective pigment flakes that are visually diffuse, nonspecular and of very low gloss.

Visual coloration and color matching are readily achieved by appropriate selection of the materials comprising the multilayer thin films on the two surfaces of the substrate.

The foregoing and additional features and advantages of the invention will become apparent to those of reasonable skill in the art from the following detailed description, as considered in conjunction with the accompanying drawings.

DETAILED DESCRIPTION

The following is a detailed description of preferred embodiments of the invention which are presently deemed by the inventors to be the best mode of carrying out the invention.

Figure 1:
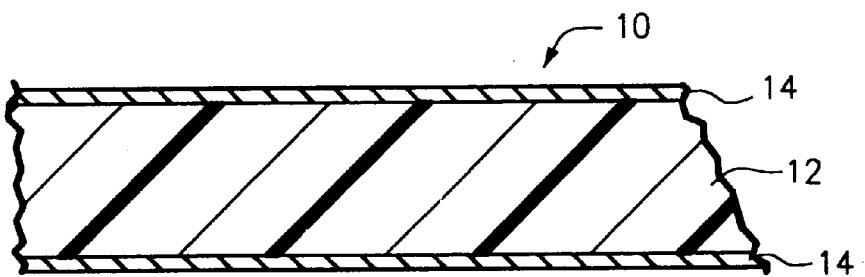
FIG. 1 is a schematic illustration, on a greatly magnified scale, of a cross-sectional view of a preferred embodiment of the pigment particle of the invention.

Referring to FIG. 1, a preferred embodiment a thin film pigment particle or flake 10 of the invention is illustrated as being comprised of a substrate 12 and a thin film optical structure 14 deposited on each of the two sides or surfaces of the substrate. The substrate 12 comprises a sheet, film or web of organic or inorganic material having a thickness within the range of from about 1 to about 20 or more microns. Various polymer films may be used for the substrate, including polyethylene teraphalate (PET) which is widely used in the solar control and metalized film industries. The two thin film structures 14 may be the same as one another or may differ from one another depending on the particular application or use. The structures may comprise any of a variety of known optical interference coatings, coatings for controlling transmittance, reflectance and/or absorptance of light energy, dichroic or dichromatic color shift coatings, and other similar coatings, wherever it is desired to utilize such coatings as pigment particles dispersed in a binder for use as a coating composition or paint. The flake 10, may for example, be constructed for use in place of the lamellar pigment particles of U.S. Pat. No. 4,168,986, or the pigment particles of U.S. Pat. No. 4,711,814, or the flake component employed in the electromagnetic shielding composition of U.S. Pat. No. 5,366,664.

As depicted schematically in FIG. 1, the substrate 12 employed in the pigment flake 10 of the invention will comprise a very substantial part of the volume of the flake, typically from 50% to about 95% or more of the volume, although it may be less than 50% depending upon the particular circumstances of use. When the substrate comprises 50% of the volume of the flake, the number of flakes required in a coating or paint film of given thickness will be half the number previously required, and the amount of the thin film material 14 required for the coating will likewise be half that previously required. If the substrate comprises two-thirds the volume of the flake, only one-third as many flakes and only one-third the amount of thin film material will be required as would otherwise be the case. Even if the substrate comprises only one-third the volume of the flake, only two-thirds as many flakes and only two-thirds as much thin film material will be required as would otherwise be needed.

The invention thus provides for very substantial savings in the amount of thin film materials required for a given coating composition or paint. Inasmuch as thin film optical devices and thin film multi-layer interference filters are customarily produced by vapor or sputter deposition under vacuum, the material savings are truly significant.

Figure 2:
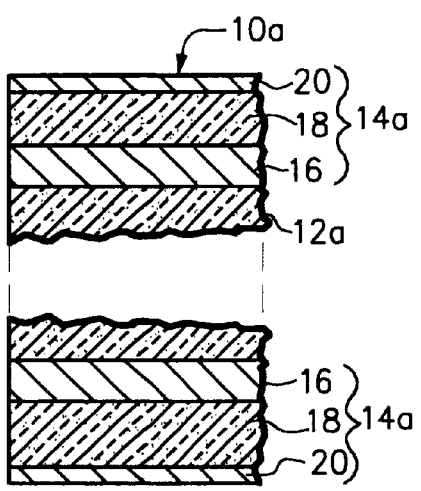
FIG. 2 is a schematic illustration, on a greatly magnified scale, of a pigment particle for a dichroic or color shift paint.

Referring now to FIG. 2, a dichroic or dichromatic pigment particle or flake 10a, intended for use in color shift paints, is shown as being comprised of a substrate 12a of inorganic or polymer film or sheet material and a dichroic coating 14a on each of the two sides of the substrate. Each of the coatings 14a may appropriately take the form of alternating layers of dielectric materials having different indices of refraction, for example as illustrated and described in U.S. Pat. No. 4,434,010 and its progeny. Alternatively, one or both of the coatings 14a may comprise a stack of layers (also disclosed in U.S. Pat. No. 4,434,010) comprised in sequence of a reflective metal layer 16, a dielectric layer 18 and a semi-opaque metal layer 20. The metal layers 20 may be formed of chromium or a nickel-chromium alloy, the dielectric layers 18 from polymer, silicon dioxide, aluminum oxide or magnesium fluoride, and the layers 16 from aluminum, silver, gold or copper. The polymer for layers 18 may be selected from the group comprising acrylic polymers and copolymer blends, epoxy, polyester, polystyrene, styrene copolymers, polyurethane and vinyl ester. Each stack 14a has a strong dichroic optical effect.

Dichroic paint pigments or flakes currently available on the market have a thickness in the order of about 0.8 microns. A typical dichroic paint formulation requires a flake or particle volume concentration (PVC) in a film forming binder of about 15%. A typical auto body paint film thickness is in the order of about 0.004 inch, or 101.6 microns. The paint film therefore requires 19 of the prior art flakes through its thickness. According to the present invention, two 0.8 micron thick dichroic coatings, 14a in FIG. 2, can be applied to the opposite sides of, for example, a two micron thick substrate 12a, to form a flake 10a having an overall thickness of 3.6 microns. At this flake thickness, only 5 flakes are required, in contrast to the prior art 19 flakes. Moreover, the amount of thin film dichroic coating materials required is reduced from 15.2 microns to 8 microns, a savings of nearly 50% in expensive, vacuum deposited, thin film multilayer optical structures. By utilizing a thicker substrate 12a, the savings can be even greater.

Figure 3:
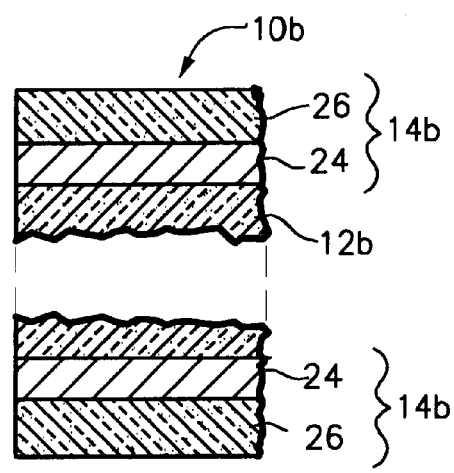
FIG. 3 is a schematic illustration, on a greatly magnified scale, of a pigment particle for a paint having the property of selective solar absorption.

FIG. 3 illustrates schematically a pigment particle flake 10b for a coating composition or paint having selective solar absorption properties. The flake is comprised of a substrate 12b bearing on each side thereof a thin film multi-layer optical structure 14b. Each structure 14b, which is known from U.S. Pat. No. 4,434,010 and its progeny, is comprised of a layer 24 of reflecting material and a layer 26 of cermet material. By utilizing a substrate 12b comprising 50% or more of the volume of the flake 10b, savings of 50% or more in the use of expensive cermet materials can be achieved. As an alternative to the use of cermets, the coatings 14b could comprise optical interference type coatings having selective solar absorption, transmission and reflection.

Figure 4:
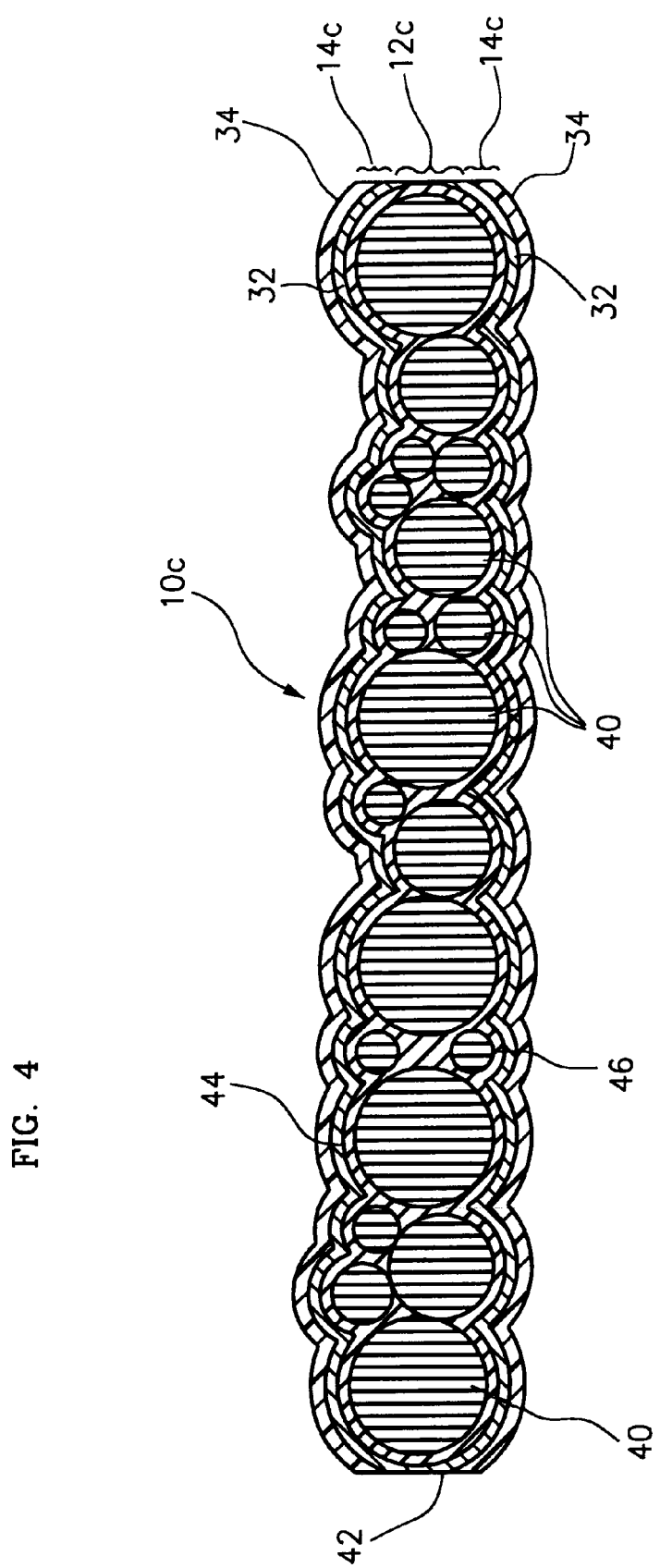
FIG. 4 is a schematic illustration, on a greatly magnified scale, of a pigment particle for an infrared reflective, radio frequency transparent coating composition.

FIG. 4 illustrates a preferred embodiment of a pigment flake 10c for use in the formulation of infrared (IR) reflective and radio frequency (RF) transparent coating compositions. The flake 10c comprises a substrate 12c and a thin film multilayer optical structure 14c deposited on each of the two sides of the substrate. Each structure is comprised of a thin film 32 of an infrared reflective material deposited on the respective side or surface of the substrate, and a thin film topcoat 34 deposited over each of the reflective films 32. The top coat layers 34 are formed of materials that are infrared and radio frequency transparent and electrically insulating.

The substrate 12c, the preferred embodiment of which will be described in detail hereinafter, is comprised of a sheet or film of RF transparent dielectric material. The substrate may be visually and infrared transparent or opaque. Its thickness should fall within the range of from about 1 to about 20 microns.

The IR reflective layers 32, which are electrically conductive, may be comprised of any one of several materials, such as metals and metal oxides, including aluminum, gold, silver, indium oxide, tin oxide, and indium tin oxide (ITO). Highly reflective metal layers would typically be in the order of 100 A to 300 A or more thick, and an oxide layer would typically be from about 500 A to about 2,000 A thick, thereby to provide IR energy reflectance of 80 to 98%. Because the flakes of the invention require only two layers of IR reflective metal, they contain much less metal and are therefore much less expensive than prior art IR reflective flakes. Typical prior art IR reflective flakes are comprised of nearly 100% metal, whereas the flakes of the invention require only 1 to 2%. This reduction in metal content also assists in achieving the RF transparency of the flakes.

The IR and RF transparent insulating top coat layers 34 may be selected from a variety of materials including germanium, silicon, alumina, oxides of nickel and chromium, molybdenum oxide, yttria and zirconium oxides, calcium fluoride, zinc sulfide, arsenic triselenide, gallium arsenide, zinc selenide, potassium chloride, etc. The thickness of the coating may range from about 500 to about 10,000 Å.

The IR reflective layers 32 and insulating top coat layers 34 can be selected and applied at respective thicknesses to impart a desired visual coloration to the flake 10c, e.g., black, gray, blue, tan, orange, etc. For example, silver may be coated with germanium or nickel oxide to produce a black flake; with silicon to produce an orange flake; or with chromium oxide to produce a green flake. Variations in the thickness of the coatings will produce variations in the colorations. Other materials for the top coat 34 will produce other colors. Flakes of different colors may be mixed together in a liquid carrier to produce still other colors, the same as with conventional paints. Also, to achieve additional colorations, the IR reflecting pigment flakes of the invention can be mixed in a liquid carrier with non-IR reflecting pigments, provided the resultant reduction in IR reflectance is not excessive.

Because the top coat layers 34 are RF transparent, it would normally be anticipated that the conductive layers 32 would reflect RF energy as well as IR energy. However, as explained in part in U.S. Pat. No. 5,506,053, RF transparency and additional objectives of the invention are achieved by (1) employing pigment particles or flakes 10c of small size in relation to the wavelengths of RF energy; (2) providing flakes having a high volume, inexpensive, organic or inorganic core; (3) reducing the amount of IR reflective metal in each of the flakes; (4) dispersing the flakes in an IR and RF transparent film forming liquid carrier or binder to make a coating material, i.e., a paint; and (5) insulating the pigment particles so that the reflective layers 32 are in essence electrically isolated from one another by the coatings 34. The resultant coating material or paint thus comprises a dispersion of discrete, insulated, flake-like pigment particles in a fluid matrix. Since each pigment particle has the characteristics described, and the metal layers in each particle are covered by and substantially encapsulated in insulation, only minimal currents can be driven in the metal and RF energy will therefore pass through the coating material or paint.

Consequently, when the paint is applied to an object and permitted to dry, the resultant film or coating will be RF transparent and IR reflective. In addition, it can be visually colored as above explained.

The liquid carrier or film forming binder for the coating materials and paint compositions above described may be any of a number of materials, including organic and inorganic materials. Polymers are of particular interest since they can be cured by passing the coated object through a curtain of ultraviolet radiation. The size of the pigment flakes and the concentration of the flakes in the binder must of course be sufficient to serve the intended purpose. Generally, the discrete flakes should fall within the size range of 10 to 500 microns, and should have an aspect ratio (length to width ratio) within the range of from 1:1 to about 5:1. Typical concentrations of the flakes in the liquid matrix are about 10–50% by volume, but the concentration may be varied depending upon the result to be achieved.

In the completed coating compositions, the inexpensive substrate cores 12 of the flakes 10 will fill a substantial volume of the composition. Typically, the substrate or core 12 will comprise more than 50% and as much as 95–99% of the volume of each flake. Consequently, a coating composition having given characteristics can be formulated with far fewer flakes of the invention than with the flakes of the prior art. See the example set forth earlier herein wherein three of the IR reflective flakes of the present invention serve the same functions and provide the same benefits as fifty of the prior art IR reflective flakes.

As revealed by the examples, the invention provides pigment particles or flakes of very high volume that facilitate the formulation of coating compositions that are far more economical than the compositions of the prior art.

For some of the coating applications above described, such as auto body paints, it is usually desired that the coating when applied to an object be visually coherent, specular and shiny. For such applications, the surfaces of the substrate 12, 12a should be smooth and the thin films 14, 14a of uniform thickness with smooth surfaces. In other applications, such as IR reflective coating compositions, it is usually desired that the coating when applied to an object be visually diffuse and nonspecular. For the latter purpose, the present invention provides a substrate having rough, irregular or incoherent surfaces so that the coating composition of the invention when applied to an object will be diffuse and nonspecular.

Referring again to FIG. 4, the preferred embodiment of the substrate 12c for the IR reflective pigment flakes of the invention is a composite structure comprised of dielectric microspheres 40, or alternatively microballoons, dispersed throughout a film forming polymer or inorganic binder matrix 42. While the spherical elements 40 are illustrated in FIG. 1 as being fairly evenly dispersed in a substantially monolayer configuration, non-uniform dispersions and multilayer configurations are equally useful. Also, the elements need not be spheres. Other filler materials of different shapes will also serve the purpose. The primary requirement is that the surfaces of the elements 40 dispersed in the matrix 42 be replicated at the two surfaces of the substrate in order to provide substrate surfaces 44 and 46 that are irregular or incoherent and visually diffuse. Spheres are however the preferred filler elements and, as shown in the illustrated embodiment of the invention, may be of various sizes within he range of from about 1 to about 15 microns.

The thin films 32 and 34 are deposited on the irregular surfaces 44 and 46 of the substrate 12c in such manner as to essentially duplicate the irregular and diffuse substrate surfaces. Thin films of uniform thickness which duplicate the substrate surfaces may be deposited by any conventional method, suitably and preferably vapor deposition and/or sputter deposition.

The high volume pigment particles or flakes of the invention may be produced in various manners utilizing known processing equipment. In one method of practice of the invention, wherein the substrate 12 has sufficient mechanical strength to withstand vapor and/or sputter deposition processes, a wide, continuous web or film of the substrate material, in sheet or roll form, may be moved past appropriate film deposition stations to deposit on each surface or side thereof thin films of the materials comprising the structures 14, 14a, 14b or 14c. The two sides of the substrate may be coated simultaneously or sequentially and the films may be applied in sequential order in a multi-station deposition apparatus or by sequential use of single station deposition apparatus. In any event, thin film coating of the sheet or film of substrate material is accomplished efficiently, expeditiously and economically.

After coating, the film or sheet is cut, chopped or otherwise divided into discrete flakes of the desired size and geometric shape. The flake size will generally be within the range of 10 to 500 microns with an aspect ratio between 1:1 and 5:1. The flakes may be square or rectangular, round or oval, or any other shape desired. Cutting the sheet into flakes may be achieved in any known manner, e.g., by running the sheets through a chopper such as employed in producing "glitter". The resultant flakes are physically stable and non-frangible. They will therefore retain their size, shape and optical properties in the applied coating.

Figure 5:
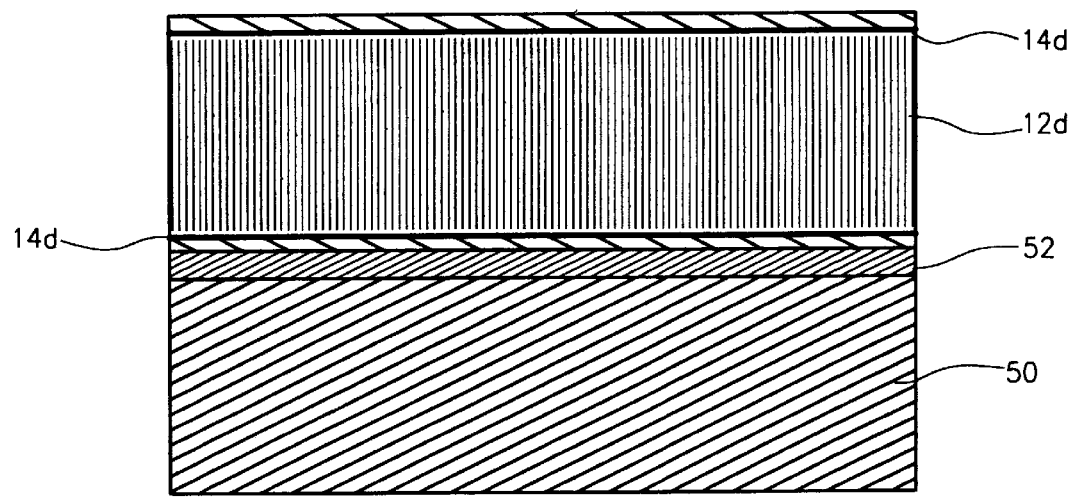
FIG. 5 is a schematic illustration, on a reduced but still magnified scale, depicting a method of making dual coated pigment flakes having a very thin substrate.

A second method of making the pigment flakes of the invention, which is depicted schematically and illustratively in FIG. 5, has particular application to the production of flakes in which it is desired to have a core or substrate 12 that does not have sufficient mechanical strength to withstand the selected thin film deposition process or processes.

As shown in FIG. 5, a manufacturing substrate 50 of the requisite strength and which may be reusable is coated on one surface thereof with a layer 52 of water or solvent soluble release material, e.g., soap, polyvinyl alcohol or polystyrene. The substrate may be a wide continuous film of a suitable polymer, e.g., PET, in sheet or roll form, for purposes of continuous in line processing.

The release coated substrate 50, 52 is then coated with a first thin film structure 14d (which may be any of the structures 14, 14a 14b or 14c).

A substrate layer 12d is then formed by applying a selected liquid or flowable organic or inorganic material in film form of the desired thickness onto the first film 14d to form on the film a layer 12d of substrate material that will comprise the core of the pigment particle flakes 10d. A roll coating process may suitably be used for application of the layer 12d of substrate material.

The applied layer 12d of substrate material, which is preferably a polymer, is then cured and polymerized, suitably by passing the manufacturing substrate 50 with its applied coatings 52, 14d and 12d through an ultraviolet (UV) or electron beam (E Beam) curing station.

A second thin film structure 14d is then deposited on the uncoated upper surface of the substrate 12d.

When the coating and deposition steps have been completed, the substrate 50 is immersed in or exposed to water or an appropriate solvent to dissolve the release coat 52 and free the sheet of optical pigment material from the manufacturing substrate. The manufacturing substrate may then be conditioned for further use.

The sheet of optical pigment material floated off the substrate 50 is then broken into pieces or chunks, after which it is reduced to size. Preferably, this is achieved by dispersing the pieces of material in a high viscosity fluid and subjecting the pieces of material to high shear in a high shear mixer. The duration of mixing will in general determine the pigment flake size. A high shear mixer will produce flakes having some size distribution, but such size distribution has been found to be desirable so long as the flakes are of pigment particle performance size.

The substrate 12d may have smooth planar surfaces for producing flakes that are visually reflective and specular, or the manufacturing substrate 50 and the substrate 12d forming the core of the flakes may be filled with particulates to produce flakes that are visually diffuse and nonspecular.

Figure 6:
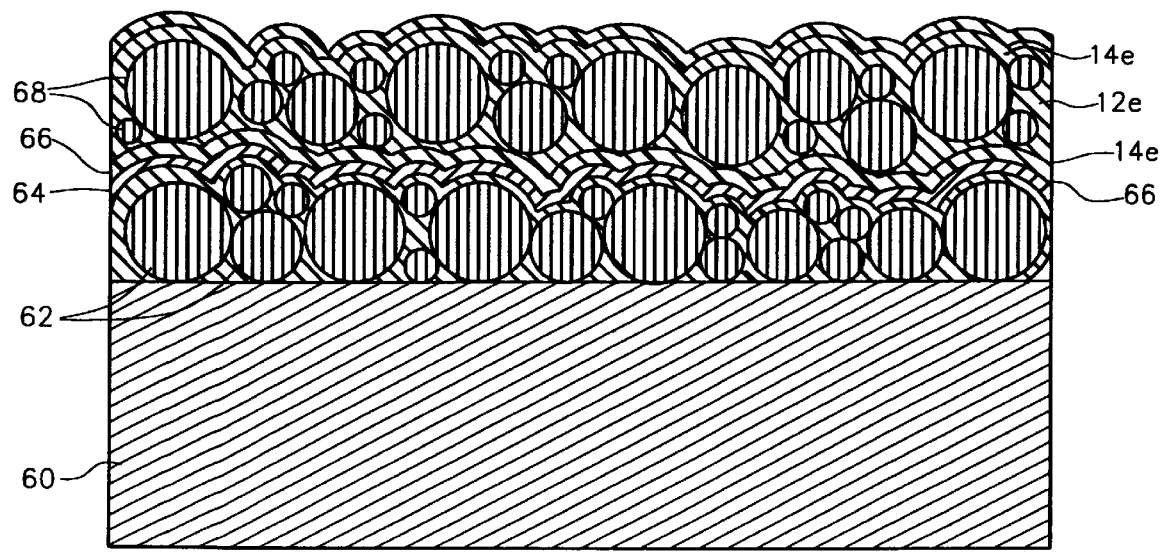
FIG. 6 is a schematic illustration, on a greatly magnified scale, of a preferred method for making dual coated pigment flakes that are visually diffuse and nonspecular.

A particular method of making multilayer thin film pigment flakes that are visually diffuse and nonspecular is depicted schematically and illustratively in FIG. 6. This method is the presently preferred mode of manufacture of the IR reflective pigment flakes of the invention.

Referring to FIG. 6, a manufacturing substrate 60 of the requisite strength and which may be reusable is manufactured in much the same manner as described in respect of the substrate 12c of FIG. 4. Specifically, particulate matter 62 is dispersed in a suitable polymer, such as PET, to form on at least one side of the substrate (the upper side in FIG. 6) a rough or irregular and diffuse surface 64. The preferred particulates 62 are spheres which form hemispherical bumps or protrusions on the surface 64 of the substrate 60. The substrate thus formed may be a wide continuous film, in sheet or roll form, for purposes of continuous in-line processing.

The surface 64 of the manufacturing substrate 60 is coated with a layer 66 of water or solvent soluble release material, e.g., soap, polyvinyl alcohol or polystyrene, which conforms to and duplicates the irregular and diffuse surface 64.

The release coated manufacturing substrate is then coated with a first thin film structure 14e deposited in such manner that each thin film of the structure conforms to and essentially duplicates the irregular and diffuse surface 64 on the manufacturing substrate 60.

A fluent mixture of particulates 68, e.g., microspheres, dispersed in a liquid or flowable, preferably polymer, binder matrix is then applied to the film 14e to form on the film 14e a layer 12e of substrate material that will comprise the core of the pigment particle flakes 10. The lower surface of the core material 12e, as illustrated in FIG. 6, will conform to and essentially duplicate the upper surface of the thin film structure 14e. The particulates 68 contained within the liquid matrix of the substrate or core layer 12e in turn define an upper surface on the core layer 12e that will have the desired irregular and diffuse surface characteristics. A roll coating process may suitably be used for application of the layer 12e of substrate material.

The applied layer 12e of substrate material is then cured and polymerized, suitably by passing the manufacturing substrate 60 with its applied coatings 66, 14e and 12e through an ultraviolet (UV) or electron beam (E Beam) curing station.

A second thin film structure 14e is then deposited on the uncoated upper surface of the substrate 12e. The films of the structure 14e are so deposited that they conform to and essentially duplicate the irregular and diffuse upper surface of the core substrate 12e.

When the coating and deposition steps have been completed, the substrate 60 is exposed to or immersed in water or an appropriate solvent to dissolve the release coat 66 and free the sheet of optical pigment material from the manufacturing substrate. The manufacturing substrate may then be conditioned for further use.

The sheet of optical pigment material floated off the substrate 60 is then divided into flakes of the desired size. This may be achieved by cutting or chopping, or by subjecting pieces of the optical material to high shear as explained in connection with FIG. 5, or by use of other techniques. Comminuting processes may produce flakes having some size distribution, but a reasonable size distribution has been found to be desirable so long as the flakes are of pigment particle performance size.

The disclosed processes for making the flakes produce close to a 100% yield of properly sized flakes with few undersized flakes, and little if any waste.

The pigment flakes of the invention are produced conveniently and economically and provide for the formulation of multilayer thin film pigmented coating compositions that are economical and easy to apply by brush or spray.

The objects and advantages of the invention have thus been shown to be attained in a convenient, economical and practical manner.

While preferred embodiments of the invention have been herein illustrated and described, it is to be appreciated that various changes, rearrangements and modifications may be made therein without departing from the scope of the invention, as defined by the appended claims.

What is claimed is:

1. A process for making high volume thin film pigment particles for use in coating compositions having preselected optical characteristics, comprising the steps of providing a substrate comprised of a film or sheet of high volume substrate material having a thickness of from about 1 to about 20 microns, coating both sides of the substrate with a thin film structure of material capable of providing the preselected optical characteristics, and dividing the coated substrate into small particles of performance size for use as particulate pigments in coating compositions.

2. A process as set forth in claim 1 wherein the thickness of each thin film structure is in the order of from about 0.1 to about 5 microns.

3. A process as set forth in claim 1 wherein the coated substrate is divided into small particles having sizes within the range of from about 10 to about 500 microns.

4. A process as set forth in claim 3 wherein the substrate is divided into small particles having length to width aspect ratios of from 1:1 to about 5:1.

5. A process for forming a coating composition having preselected optical characteristics comprising the step of dispersing the high volume particles claimed in claim 1 in a film forming binder at a concentration of from about 10% to about 50% by volume.

6. A process as set forth in claim 1 including the step of providing a substrate having rough or irregular surfaces such that when the coating composition is applied to an object the coating is diffuse.

7. A process as set forth in claim 1 wherein the substrate comprises dielectric particulates dispersed in a polymer binder of a thickness within the range of from about 1 to about 15 microns and wherein the particulates are replicated on both sides of the substrate to form visually diffuse surfaces on both sides of the substrate.

8. A process for making high volume thin film pigment particles for use in coating compositions having preselected optical characteristics, comprising the steps of forming a manufacturing substrate having sufficient strength to withstand performance of the process, coating a surface of the manufacturing substrate with a layer of release material, depositing on the release coated surface of the manufacturing substrate a first thin film structure of material capable of providing the preselected optical characteristics, applying onto the first thin film structure a high volume film of substrate material having a thickness of from about 1 to about 20 microns for forming the core of the pigment particles, depositing onto the core forming substrate material a second thin film structure of material capable of providing the preselected optical characteristics, releasing the thus formed sheet of optical and core materials from the manufacturing substrate, and dividing the sheet of optical and core materials into small particles of performance size for use as particulate pigments in coating compositions.

9. A process as set forth in claim 8 wherein the release coated surface of the manufacturing substrate is rough or irregular and visually diffuse and the first thin film structure is deposited so as to conform to and essentially duplicate the surface of the manufacturing substrate; wherein the film of core forming substrate material is applied in liquid or flowable form whereby the surface thereof in contact with the first thin film structure conforms to and essentially duplicates the surface of the first thin film structure; wherein the core forming substrate material contains particulate matter for rendering the other surface thereof rough or irregular and visually diffuse; and wherein the second thin film structure is deposited so as to conform to and essentially duplicate the said other surface of the core forming substrate material.

10. A process as set forth in claim 8 wherein the sheet of optical and core materials is divided into small particles by subjecting the sheet to shear.

11. A process for making substrate for use in the production of thin film pigment particles that have selected optical characteristics and that are visually diffuse and nonspecular, comprising the steps of dispersing throughout a curable film forming matrix a plurality of particulates of a size sufficient to be replicated at a surface of the matrix and curing the matrix to form a film having a surface that replicates the particulates and is visually diffuse and nonspecular.

12. A process as set forth in claim 11 wherein the particulates are replicated at both surfaces of the film and thin film optical structures are deposited on both of the surfaces.

13. A process as set forth in claim 11 wherein the particulates comprise spherical particulates of a size within the range of from about 1 to about 15 microns.

14. A high volume thin film pigment particle for use in an optical coating composition having a preselected optical characteristic comprising a flake of high volume polymer core material having two sides, a thickness within the range of from about 1 to about 20 microns and a length to width aspect ratio of from 1:1 to about 5:1, and a thin film coating of material capable of providing the preselected optical characteristic on each of the two sides of said flake, each said coating having a thickness in the order of from about 0.1 to about 5.0 microns, the coated flake being of a size within the range of from about 10 to about 500 microns.

15. A high volume thin film pigment particle for use in an optical coating composition having a preselected optical characteristic comprising a flake of core material having two sides, a thickness within the range of from about 1 to about 20 microns and an aspect ratio of from about 1:1 to about 5:1, said core material comprising particulates dispersed in an inorganic or polymer binder and of a size such that the particulates are replicated on both sides of the flake and render the side surfaces visually diffuse, and a thin film coating of material capable of providing the preselected optical characteristic deposited on and essentially duplicating the diffuse surfaces on each of the two sides of said flake, each said coating having a thickness in the order of from about 0.1 to about 5.0 microns, the coated flake being of a size within the range of from about 10 to about 500 microns.

16. A pigment particle as set forth in claim 15 wherein the particulates in the core material are of spherical shape.

17. A thin film optical coating composition having a preselected optical characteristic comprising a film forming binder, and discrete thin film pigment particles of high volume dispersed in said film forming binder, the pigment particles comprising flakes of a high volume polymer core material each having two sides and a thickness of from about 1 to about 20 microns, and a thin film coating of material capable of providing the preselected optical characteristic on each side of each flake.

18. A coating composition as set forth in claim 17 wherein each thin film coating has a thickness within the range of from about 0.1 to about 5 microns, and each flake has a length to width aspect ratio within the range of from 1:1 to about 5:1 and a size within the range of from about 10 to about 500 microns.

19. A coating composition as set forth in claim 17 wherein the core material of at least some of said flakes comprises particulates dispersed in an organic or polymer binder and wherein the particulates are replicated on both sides of the flake and form visually diffuse surfaces on both sides of the flake.

20. In a radio frequency transparent infrared reflecting coating material comprising an infrared and radio frequency transparent film forming binder and discrete pigment particles dispersed in said film forming binder, the improvement wherein the pigment particles comprise discrete two-sided pigment flakes having a thickness within the range of from about 1 to 20 microns, an aspect ratio within the range of from about 1:1 to about 5:1 and a size within the range of from about 10 to about 500 microns, each flake comprising a radio frequency transparent flake-like core having two sides, a layer of infrared reflective material on each of the two sides of the core, and a layer of infrared and radio frequency transparent insulating material overlying each of said layers of reflective material, the layers of insulating material substantially encapsulating the layers of reflective material on each flake and substantially isolating the layers of reflective material on the respective flake from the layers of reflective material on the other flakes such that when the coating material is applied to an object the coating is infrared reflective and radio frequency transparent.

21. A coating material as set forth in claim 20, wherein the surface on at least one of the two sides of at least some of the flakes is irregular and diffuse.

22. A coating material as set forth in claim 20 wherein at least one layer of reflective material on at least some of the flakes is comprised of metal and has a thickness of at least about 100 Å.

23. A coating material as set forth in claim 20 wherein at least one layer of reflective material on at least some of the flakes is selected from indium oxide, tin oxide or indium tin oxide and has a thickness in the order of from about 500 Å to about 2,000 Å.

24. A coating material as set forth in claim 20 wherein each of the layers of insulating material on each of the flakes has a thickness in the order of from about 500 Å to about 10,000 Å, and is selected from the group of materials including germanium, silicon, alumina, oxides of nickel, molybdenum and chromium, yttria and zirconium oxides, calcium fluoride, zinc sulfide, arsenic triselenide, gallium arsenide, zinc selenide, and potassium chloride.

25. A coating material as set forth in claim 20 wherein the surfaces on the two sides of the majority of the flakes are irregular and diffuse such that when the coating material is applied to an object the coating is diffuse.

26. A coating material as set forth in claim 25 wherein the flakes are visually colored and when applied to an object form a coating that is infrared reflective, radio frequency transparent, visually colored and diffuse.

27. A coating material as set forth in claim 20 wherein the core material of at least some of the flakes comprises dielectric particulates dispersed in an inorganic or polymer binder and of a size such that the particulates are replicated on both sides of the flake and render the side surfaces visually diffuse, said layers of reflective material and said layers of insulating material being deposited upon and essentially duplicating said diffuse surfaces such that when the coating material is applied to an object the coating is diffuse and nonspecular.

28. A pigment particle as set forth in claim 14 wherein the flake is radio frequency transparent and the thin film coating on each of the two sides of the flake comprises a first layer of infrared reflective material and a second layer of infrared and radio frequency transparent insulating material.

29. A pigment particle as set forth in claim 14 wherein the thin film coating on each of the two sides of the flake comprises a coating having selected reflectance, transmittance or absorptance of light energy.

30. A pigment particle as set forth in claim 14 wherein the thin film coating on each of the two sides of the flake comprises a first layer of light reflective material and a second layer of cermet material.

31. A pigment particle as set forth in claim 14 wherein the thin film coating on each of the two sides of the flake comprises an optical multi-layer stack comprised of alternating layers of materials having different indices of refraction.

32. A pigment particle as set forth in claim 14 wherein the thin film coating on each of the two sides of the flake comprises a dichroic coating.

33. A pigment particle as set forth in claim 14 wherein the thin film coating on each of the two sides of the flake comprises a first layer of light reflective metal, a second layer of dielectric material and a third layer of a semi-opaque metal.

34. A optical coating composition as set forth in claim 17 wherein the preselected optical characteristic is a visually perceived color shift and wherein the thin film coating on each of the two sides of each flake comprises a dichroic coating.

35. An optical coating composition as set forth in claim 34 wherein the dichroic coating comprises an optical multilayer stack comprised of alternating layers of materials having different indices of refraction.

36. An optical coating composition as set forth in claim 34 wherein the dichroic coating comprises a first layer of light reflective metal, a second layer of dielectric material and a third layer of a semi-opaque metal.

37. An optical coating composition as set forth in claim 17 wherein the preselected optical characteristic is selective absorptance, reflectance and transmittance of light energy and wherein the thin film coating on each of the two sides of each flake is an optical multilayer stack comprised of alternating layers of materials having different indices of refraction.

38. An optical coating composition as set forth in claim 17 wherein the preselected optical characteristic is selective absorptance, reflectance and transmittance of light energy and wherein the thin film coating on each of the two sides of each flake comprises a first layer of light reflective material and a second layer of cermet material.

* * * * *